March 14, 1939.   W. SHIPPEE ET AL   2,150,788
SELF-CLINCHING NAIL
Filed Oct. 5, 1936   5 Sheets-Sheet 1
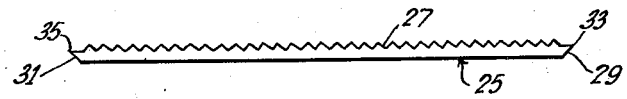
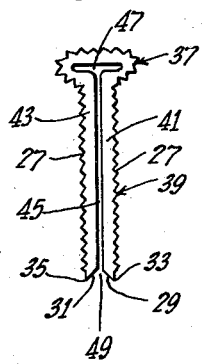
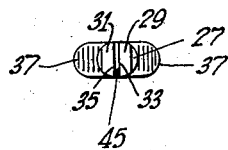 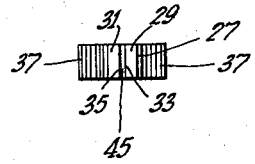
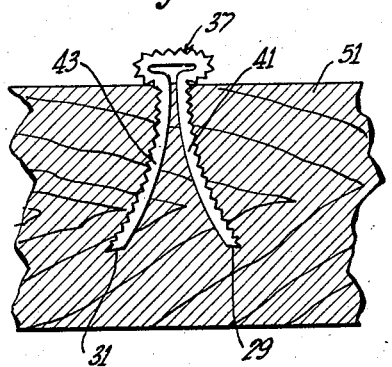
INVENTOR.
Warren Shippee and
BY Carl C. Shippee
Frederic P. Warfield
ATTORNEYS.

March 14, 1939. W. SHIPPEE ET AL 2,150,788
SELF-CLINCHING NAIL
Filed Oct. 5, 1936 5 Sheets-Sheet 2
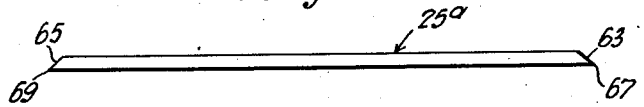
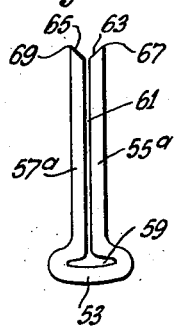
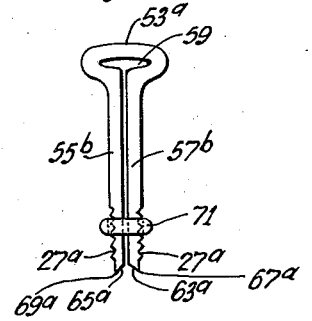
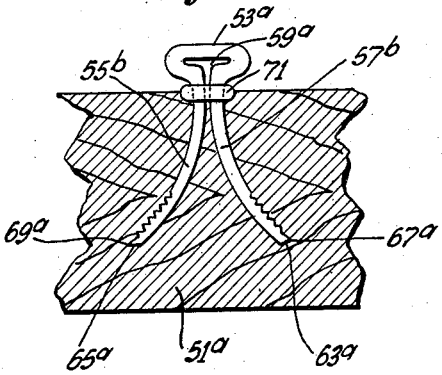

March 14, 1939.  W. SHIPPEE ET AL  2,150,788
SELF-CLINCHING NAIL
Filed Oct. 5, 1936    5 Sheets-Sheet 4
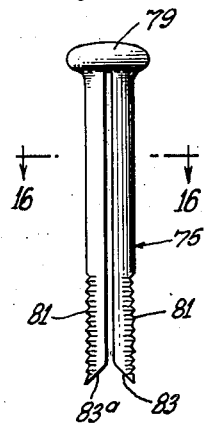
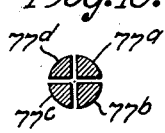
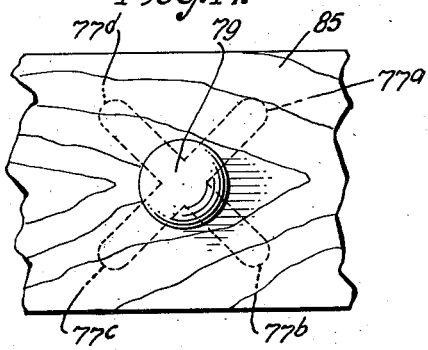
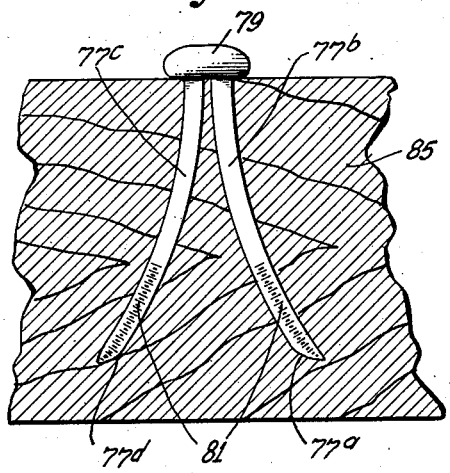
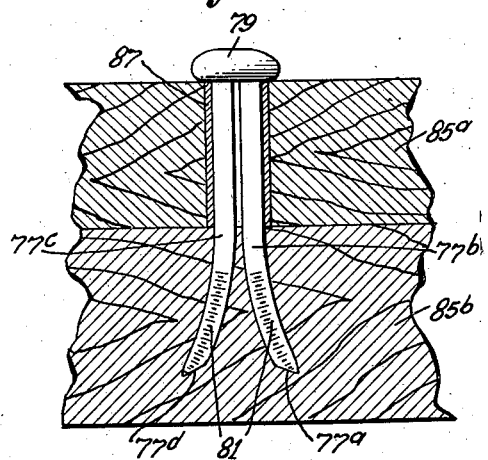
INVENTOR.
Wilson Shippee and
Carl C. Shippee
BY
Frederic P. Warfield
ATTORNEYS.

March 14, 1939. W. SHIPPEE ET AL 2,150,788
SELF-CLINCHING NAIL
Filed Oct. 5, 1936 5 Sheets-Sheet 5

INVENTOR.
Winson Shippee and
BY Carl C. Shippee
Frederic P. Warfield
ATTORNEYS.

Patented Mar. 14, 1939

2,150,788

UNITED STATES PATENT OFFICE 2,150,788

SELF-CLINCHING NAIL

Winsor Shippee and Carl C. Shippee,
Red Bank, N. J.

Application October 5, 1936, Serial No. 103,956

2 Claims. (Cl. 85—26)

The present invention provides an improved nail or spike construction of a type wherein the nail is self-clinching when driven into a suitable body of wood or other material substantially the same as an ordinary nail so as to prevent its being withdrawn after it has been driven into position.

More particularly, the present construction provides a spike or nail which is split longitudinally up to the head but with each member beveled inwardly, so that when the nail is inserted in wood or other material substantially the same as an ordinary nail, each member gradually opens out, producing a very firm and permanent grip on the material.

Nails and spikes of this general type are well known in the art, but are subject to certain disadvantages inherent from the manner of their production. These prior articles have been either subject to breakage, or the metal composing them is lacking in strength and rigidity to give satisfactory penetration.

One object of the present invention therefore, is to provide a self-expanding nail or spike which will be sufficiently rigid to give satisfactory penetration into the selected material, while expanding incident to driving so as to grip the material in a permanent manner, yet which will not be subject to breakage during the driving and expansion thereof.

Further objects of the invention will become apparent as the description proceeds, and the features of novelty will be pointed out in particularity in the appended claims; and the invention accordingly comprises the sequence of steps of the operation, the features of construction, combination of elements, and arrangement of parts which will be exemplified in the construction hereinafter set forth, and the scope of the application of which will be indicated in the claims.

In accordance with the present invention, the improved nail, spike, or the like, is made from a blank comprising a substantially straight wire of any desired cross-sectional shape, and of sufficient strength and rigidity to produce the required penetration when shaped into the finished nail. The ends of the blank are sharply beveled to form penetrating points, and one side of the blank may be milled or corrugated along its length so that the outer periphery of the finished nail may present a roughened surface to increase the grip of the nail on the material into which it may be driven. The blank is folded or bent until the shank of the nail is produced by a multiple of cooperating contiguously lying prongs of equal length and which form a bifurcated shank, each prong being beveled symmetrically inwardly from the point thereof, so that as the nail is driven into a selected body of material, the prongs will spread and bend outwardly, thereby effectively preventing a casual withdrawal of the nail.

Before the nail is driven, the prongs may lie side-by-side in contiguous relationship, as has been mentioned above, or in some forms of the nail they may be merely adjacent while being spaced along their entire length. In any case, the spreading and bending of the prongs incident to the penetration of the nail into the given body of material produce a firm anchoring of the nail in the said material.

In addition to the folding or bending, the blank is headed in any suitable manner; and the bending or folding of the blank produces an opening in the head portion of the nail which communicates with the division between the prongs, this space increasing the relative yielding of the prongs at their juncture with the head, thus facilitating the relative separation of the prongs during driving and reducing the tendency of the nail to split at the head as it is driven into the work; and there is no excessive tendency of the nail or spike to split across the head either during or after its penetration into the work.

The wire blank may be of any desired cross-sectional shape, for instance, round, half-round or rectangular. It may be passed between rolls to corrugate its surface, as above described, and the ends of the blank are beveled. The blank is then folded so that the resulting prongs of the nail assume preferably a contiguous position, with the bevels at the ends extending inwardly of the nail shank from the points so that when the nail is being driven, the beveling at the ends of the prongs will cause the prongs to separate and to bend so as to clinch the nail in the body of the material. The folding of the blank leaves an opening in the head portion of the nail which opening communicates with the line of division between the prongs, as described above.

The invention will be understood more clearly by reference to the accompanying drawings, in which:

Fig. 1 represents one form of blank which has been milled or corrugated along one surface, and the ends of which have been beveled;

Fig. 2 is an elevation of one form of nail produced from a blank, such as shown in Fig. 1;

Fig. 3 is an end view of a nail similar to the nail of Fig. 2, looking at the points thereof, the view showing a nail produced from a blank having a half-round cross-section;

Fig. 4 is a view similar to Fig. 3, but showing the points of a nail produced from a blank having a rectangular cross-section;

Fig. 5 shows the separation of the prongs of the nail of Fig. 2 when the nail has been driven into wooden work;

Fig. 6 is a view of a modified form of blank which has an over-all smoothness;

Fig. 7 is a view showing a stage of the manufacture of a nail from the blank of Fig. 6;

Fig. 8 is a view of a finished nail as made in accordance with the showings of Figs. 6 and 7;

Fig. 9 is a view of a modified form of nail;

Fig. 10 is a view showing the separation of the prongs of the nail of Fig. 9 when driven into work;

Fig. 15 is a view of still another form of nail having four prongs instead of two;

Fig. 16 is a sectional view along the line 16—16 of Fig. 15, looking downwardly in the direction of the arrows;

Fig. 17 is a plan view indicating the spreading of the prongs of the nail of Fig. 15 when the nail is driven into the work;

Fig. 18 is a sectional elevation of the nail of Fig. 15 when driven into the work;

Fig. 19 is a sectional elevation of a modified form of the nail of Figs. 15-18, inclusive, when driven into the work;

Figure 11:
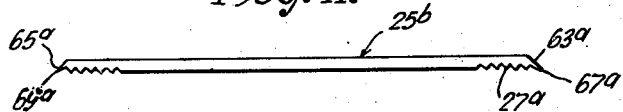
Fig. 11 is a view of a still further modified form of blank, the view being generally similar to Figs. 1 and 6, but showing a blank roughened only adjacent to its ends.
Figure 12:
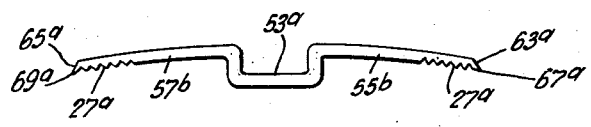
Fig. 12 is a view similar to Fig. 7 but utilizing the blank of Fig. 11.

Referring more particularly to the drawings and especially to Figs. 1 to 5, inclusive, 25 represents one form of blank which comprises a straight wire of round, half-round, or rectangular cross-sectional configuration, or any other suitable cross-sectional shape, the blank being provided with a milled or corrugated surface extending along the complete length of the blank and exaggeratedly indicated at 27. The blank is beveled at its ends, as indicated at 29, 31, points 33, 35 being formed thereby.

The blank 25 is made of wire of any selected standard gage, and is stiff and rigid, being the usual nail wire stock, thereby producing the requisite penetration of a piece of work when it is fashioned into a finished nail.

In order to make a finished nail as shown in Fig. 2, the blank 25 is bent or folded so that the nail is provided with a head 37 and shank 39, this latter comprising prongs 41 and 43 which are continuous with the head 37, and which take a closely adjacent position, either in actual engagement with each other or separated by a small space or opening 45 which enlarges into the space 47 in the head 37, which space obviously is formed incidentally to the folding of the wire blank. As has been indicated above, this space in the head portion promotes yielding of the prongs at the head as the prongs are forced apart by the driving of the nail.

When the wire blank 25 is bent to form the nail, the beveled ends 29 and 31 are brought together to form the opening 49 between the ends of the prongs, this opening enlarging towards the pointed end of the nail. Accordingly, when the nail is driven into a piece of work 51, as indicated in Fig. 5, the beveled ends 29, 31 act as guides to force the prongs 41 and 43 apart, as indicated in Fig. 5, as the nail penetrates into the work, thereby bending the prongs and anchoring the nail, as is indicated in the view of Fig. 5. The anchoring effect is increased by the action of the milled or corrugated surface 27 of the nail, it being apparent that this surface extends all around the outside of the nail, as is apparent from Figs 2 and 5.

In accordance with Fig. 3, there is shown an end view of a nail looking at the points where the nail is made out of half-round stock, while Fig. 4 shows the nail as being made out of square or rectangular stock. The reference numerals are applied as above.

In Fig. 6, the blank 25a is similar to blank 25 except that it is smooth instead of milled. As will be seen, in order to produce a nail, the blank may be given an open U-bend in the middle of the blank, as is designated at 53, which produces the head portion of the nail, leaving straight the lengths 55 and 57 which are then bent together to form the prongs 55a and 57a, and the head 53 may be pressed to round the same as will be seen in Fig. 8. The prongs 55a and 57a are continuous with the head 53 and outline the opening 59 in the head, this opening being prolonged into the opening 61 between the prongs. The prongs are beveled inwardly as indicated at 63 and 65, to form separating guides for the prongs when the nail is driven into the work, the bevels 63 and 65 forming the penetrating points 67 and 69 of the nail.

It will be seen that the nail of Fig. 8 is substantially identical with the nail illustrated in Fig. 2 except for the smooth surface of the nail of Fig. 8. The prongs 55a and 57a will be forced apart as the nail is driven into the work in a manner similar to the showing of Fig. 5.

Figs. 9 to 14, inclusive, show a further modified form of nail which, however, acts in a generally similar manner as the forms defined above.

Figure 13:
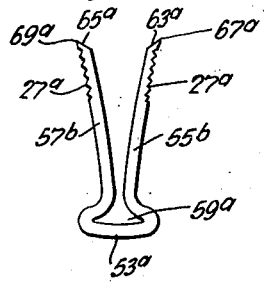
Fig. 13 is a view showing a further stage of production of a nail.
Figure 14:
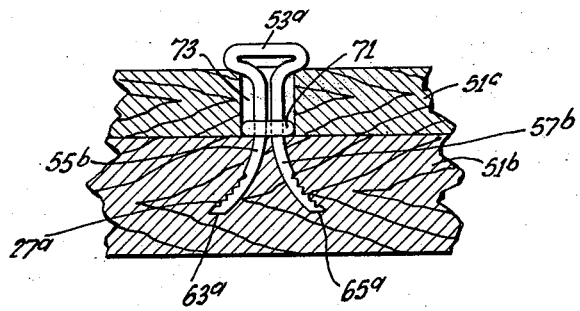
Fig. 14 shows a nail generally similar to the nail of Fig. 9, the view showing another way of using the nail.
Figure 20:
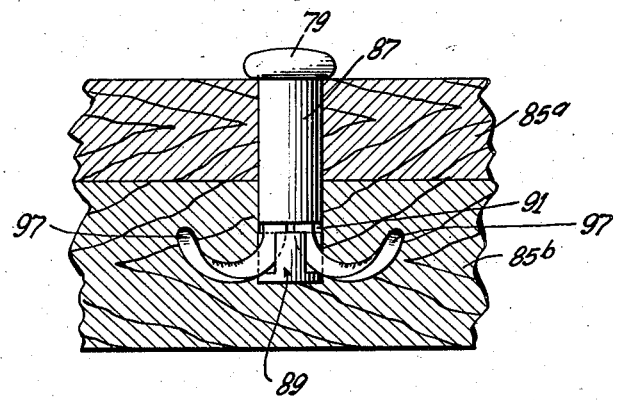
Fig. 20 is a view generally similar to Fig. 19, but showing a further modification designed to further increase the anchoring of the nail.
Figure 21:
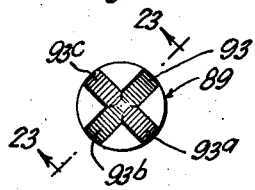
Fig. 21 is a plan view of a separator ring used in the modification of Fig. 20.
Figure 22:
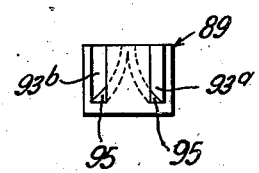
Fig. 22 is a side view of the separator of Fig. 21.
Figure 23:
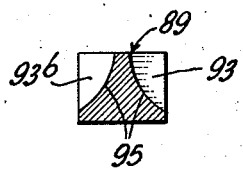
Fig. 23 is a sectional elevation of the separator, the view being taken on the line 23—23 of Fig. 21.

In this form of the nail, the blank 25b is milled or corrugated only adjacent to its ends, as is indicated at 27a. The ends are beveled in the same way as described above, as indicated at 63a, forming the penetrating points 67a, 69a. In forming the nail, the blank may be sent as at 53a in Fig. 12, this being analogous to the bend 53 shown in Fig. 7, the prongs 55b, 57b being bent as indicated in Fig. 13, and the gap between them closed, thereby forming the opening 59a in the head 53a. In order to hold the prongs 55b, 57b together during initial driving of the nail, a clamping ring 71 may be slipped over the corrugations 27a adjacent to the pointed end of the nail, so that as the nail is driven into a work piece, as indicated at 51a in Fig. 10, the tendency of the clamping ring 71 to counteract the spreading of the prongs will produce an increased bending and deformation of the prongs as the ring 71 yields under the driving of the nail, which finally assumes the position shown in Fig. 10 relative to the ring 71, which, of course, is not driven into the work. A still firmer anchoring of the nail in the work thereby is obtained, or if desired, where two work pieces are to be nailed together, as in Fig. 14, the upper piece may have a hole 73 bored therein of such diameter that the shank of the nail may be inserted freely therein while the head 53a will engage the top work-piece adjacent to the periphery of the hole 73. This procedure results in still further increased relative spreading of the lower part of the prongs 55b, 57b, as separation of the upper part of the prongs is prevented by the ring 71 which in this instance will be moved only part way along the nail shank, depending upon the thickness of the top work-piece 51c. This procedure also assures preventing excessive separation and distortion of the nail prongs before the nail has penetrated completely through the top work-piece 51c and produces invariably a satisfactory penetration and anchoring of the nail into the lower work-piece 51b while at the same time assuring that the work-pieces 51b and 51c will be nailed tightly together.

In Figs. 15 to 20 there are shown various forms of a still different type of nail embracing the features of the present invention, that is to say, instead of a two-prong nail, a four-prong nail. The shank 75 is composed of four prongs 77a, 77b, 77c and 77d which are integral with the head 79. The nail prongs may be roughened adjacent to their points, as indicated at 81, and they are inwardly tapered as designated at 83, 83a, which separate the prongs when the nail is driven into a work-piece 85 as indicated in Figs. 17 and 18.

In Fig. 19 the nail is shown as fastening together two work-pieces 85a and 85b, the shank 75 being partly enclosed in a sleeve 87 which is inserted in a suitable hole bored through the work-piece 85a, and which prevents separation of the prongs except at the lower portions thereof, which spread apart as they are driven into the work-piece 85b, thereby anchoring the nail into the work-piece.

The separation of the prongs may be increased by employing a separator ring 89, in conjunction with the sleeve 87, the separator ring being placed in the bottom of a hole 91 bored into the work-pieces. The separator ring 89 is provided with sloping apertures 93, 93a, 93b, 93c, the sides of the slots diverging downwardly and outwardly, as indicated at 95. The apertures in the separator ring are adapted to receive the prongs of the nail and as the nail is driven into the work-piece, the prongs are caused to separate and even to turn upwardly, as indicated at 97 in Fig. 20, thus immovably anchoring the nail in place.

The prong end of the finished nail may also be dipped in some substance reasonably soft so as not to retard its driving and yet reasonably stiff so as to eccentuate the spreading tendency of the prongs. This material should be such as would break adherence with the nail under the first hammer blows. As examples may be noted, resin, lead, tin, pulp, plaster, and wax. This material would initially adhere to and fill up the space between the bevels of the prongs 35 and 33 at the area indicated by 49 in Fig. 2. Such material would also have the advantage of acting as a driving lubricant.

It will be seen, therefore, that the invention may take many forms which embrace the same principle, and it will be understood that the present invention is not limited, necessarily, to the precise details of the steps, manipulations, and structure, as are herein specifically illustrated and described, but it will be apparent that such details are subject to various modifications which will become apparent readily to one skilled in the art, without departing from the spirit of the invention; and it will be understood, therefore, that it is intended and desired to include within the scope of the invention such modifications and changes as may be necessary to adapt it to varying conditions and uses.

It is also to be understood that the following claims are intended to cover all of the generic and specific features of the invention herein described, and all statements of the scope of the invention which, as a matter of language, might be said to fall therebetween.

Having described our invention, what we claim and desire to secure by Letters Patent is:

1. A self-anchoring nail comprising, in combination, a head and a shank integral therewith, the shank comprising a plurality of prongs extending the entire length of the shank, the said prongs being of sufficient strength and rigidity to enable them to be driven into a wooden work-piece, while being separable incident to their penetration into the work-piece, inwardly extending bevels on the prongs adapted to exert a separating and bending force on the prongs as they penetrate into the work-piece, and a separating member carried by said shank provided with diverging recesses for receiving the prongs and divergingly bending the prongs as the nail is driven into the work-piece.

2. A self-anchoring nail comprising, in combination, a head and a shank integral therewith, the shank comprising a plurality of prongs extending the entire length of the shank, the said prongs being of sufficient strength and rigidity to enable them to be driven into a wooden work-piece, while being separable incident to their penetration into the work-piece, inwardly extending bevels on the prongs adapted to exert a separating and bending force on the prongs as they penetrate into the work-piece, and a ring member slidable on said shank and provided with diverging recesses for receiving the prongs to accentuate the separation and bending of at least a portion of the prongs as the nail is driven into the work-piece.

WINSOR SHIPPEE.
CARL C. SHIPPEE.